United States Patent [19]

Nixon

[11] Patent Number: 4,583,030
[45] Date of Patent: Apr. 15, 1986

[54] PITCH/TRIM CONTROL

[75] Inventor: John M. Nixon, Mineral Wells, Tex.

[73] Assignee: Century Flight Systems, Inc., Mineral Wells, Tex.

[21] Appl. No.: 404,823

[22] Filed: Aug. 3, 1982

[51] Int. Cl.⁴ .............................................. B64C 13/04
[52] U.S. Cl. .................................... 318/580; 318/584; 318/586; 318/585; 244/178
[58] Field of Search .................. 318/580, 584–586, 318/331, 564; 244/178

[56] References Cited

U.S. PATENT DOCUMENTS

| | | |
|---|---|---|
| 3,201,675 | 8/1965 | Curran et al. |
| 3,510,092 | 5/1970 | Hendrick et al. |
| 3,565,370 | 2/1971 | Moller |
| 3,659,173 | 4/1972 | Pfersch |
| 3,793,574 | 2/1974 | Hamel |
| 3,801,049 | 4/1974 | Simpson et al. |
| 3,848,833 | 11/1974 | Rauschelbach |
| 3,918,662 | 11/1975 | Vircks et al. |
| 3,920,966 | 11/1975 | Knemeyer et al. |
| 3,936,715 | 2/1976 | Nixon et al. |
| 3,950,687 | 4/1976 | Watson, Jr. |
| 3,967,799 | 7/1976 | Muller |
| 4,004,756 | 1/1977 | Gerstine et al. |
| 4,095,271 | 6/1978 | Muller |
| 4,114,842 | 9/1978 | Hofferber et al. |
| 4,198,017 | 4/1980 | Murray ............. 244/178 X |
| 4,281,811 | 8/1981 | Nixon |
| 4,291,260 | 9/1981 | Nixon ............... 318/331 |

Primary Examiner—William M. Shoop
Assistant Examiner—Saul M. Bergman
Attorney, Agent, or Firm—John F. Booth; Gerald G. Crutsinger; Monty L. Ross

[57] ABSTRACT

Aircraft attitude along the pitch axis is controlled by inputting a velocity command to a pitch control subsystem that includes a velocity side channel and a gain side channel of a pitch servo amplifier. An output from each channel of the pitch servo amplifier is applied to a pitch servo motor for positioning a primary control surface. The velocity of the pitch servo motor is detected by a velocity detector that generates a velocity feedback signal and control signals for each channel of the pitch servo amplifier. Also responsive to the velocity signal of the detector is a pre-flight test circuit for pre-flight checkout of the pitch control subsystem. In each line from the output of the channels of the pitch servo amplifier is a current detector that is part of a pitch trim control subsystem that responds to the current through the pitch servo motor to generate a trim velocity command signal. This velocity command signal is input to a velocity side channel and a gain side channel of a trim servo amplifier. An output from each channel of the trim servo amplifier is applied to a trim servo motor for positioning trim tab surfaces as part of the primary control surface. Again, the velocity of the trim servo motor is detected by a velocity detector that generates a velocity feedback signal and control signals for each channel of the trim servo amplifier.

22 Claims, 8 Drawing Figures

FIG. 6A TRIM SERVO AMPS

FIG. 6B

PITCH/TRIM CONTROL

TECHNICAL FIELD

This invention relates to the control of an aircraft, and more particularly to the automatic control of the attitude of an aircraft relative to the pitch axis by means of a control system and a trim control system, both functioning together.

BACKGROUND ART

Pitch axis control systems including both a pitch control system and a trim control system are adaptable to provide a plurality of control functions. One such function is to maintain level flight at a given attitude thereby relieving the pilot of the need to constantly adjust the pitch axis control elements to compensate for turbulence. In addition, a pitch axis control system enables the pilot to command an aircraft attitude other than horizontal. Pitch axis control systems are also made responsive to a glide slope coupler to automatically control aircraft approach for landing.

In most aircraft, the primary pitch control is subject to the greatest movement in order to obtain all the necessary flight attitudes. Nearly all aircraft are provided with a pilot actuated pitch control system which is manually adjusted during take-off, climb, approach and landing, and from time to time during normal flight as a result of changes in power settings, changes in the weight of the aircraft due to the use of fuel and shift of passengers, or when changing altitude. With an aircraft operating in a selected attitude the primary pitch control system is automatically adjusted from an autopilot system. Virtually all general aviation aircraft have a trim system which is a subsystem of the primary pitch control and is used to establish a desired pitch attitude without a force being applied to the primary pitch control surface by the pilot, or by the autopilot. The trim system usually accommodates all control changes necessary during normal flight. Proper adjustment of the pitch trim system materially reduces pilot fatigue when the aircraft is operated in the manual mode and improves the handling capabilities of the aircraft.

If an aircraft is not properly trimmed while being controlled by an automatic pilot, the autopilot will be required to continuously exert a corrective force on the controls. This, together with changes in the trim requirement during the course of autopilot flight, frequently results in relatively high and occasionally excessive loads on the autopilot. On occasion this results in an abrupt change in the attitude of the aircraft which can be quite disturbing to occupants of the aircraft and at best, is undesirable.

Additional convenience and safety have heretofore been provided by electrically operated pitch trim systems such as, for example, the one described in U.S. Pat. No. 3,936,715 issued Feb. 3, 1976 to John M. Nixon, et al. The system disclosed in this patent automatically trims the aircraft in response to a voltage applied to an integrated type servo motor coupled to the primary control surface.

Another automatic trim system which is available for aircraft trim control in flight is described in U.S. Pat. No. 4,281,811, issued Aug. 4, 1981 to John M. Nixon. This patent describes an automatic trim system that includes a control surface and a trim surface associated with the control surface for changing the effect of the control surface to maintain a desired flight attitude. The system includes a limiter responsive to an input signal that generates a limited trim control signal having a preselected maximum amplitude. The signal of limited authority varies up to plus or minus 20% of a normalized out-of-trim signal. The system includes a malfunction detector that identifies a trim system malfunction to generate a signal that disconnects the trim system from automatic operation.

DISCLOSURE OF THE INVENTION

In accordance with the present invention, there is provided an aircraft control system that responds to a motor velocity command signal. The control system comprises a servo loop including a servo motor harving two terminals and connected to an aircraft control surface. The servo loop further includes means for applying an electrical signal to actuate the servo motor and thereby move the controlled surface. Connected to the terminals of the servo motor is a velocity detector that responds to servo motor velocity to generate a motor velocity signal. This motor velocity signal is connected to a first amplifier channel that also responds to the motor velocity command signal to provide an output to one terminal of the servo motor. A second amplifier channel is also connected to respond to the velocity command signal and produces an output to the second terminal of the servo motor.

Further in accordance with the present invention, there is provided an aircraft control system that comprises a primary servo system that includes a servo motor having two terminals and is connected to a primary control surface for operation thereof in response to an applied signal. Also included as a part of the control system is a trim servo system having a servo motor with two terminals and is connected to trim means for the primary control surface for operation of the trim means in accordance with an applied signal. A circuit responds to the signal applied to the primary servo motor and generates a trim servo motor velocity command. A velocity detector is connected to the two terminals of the trim servo motor and responds to the velocity thereof to generate a trim motor velocity signal. The trim motor velocity signal and the trim motor velocity command are applied to a first amplifier channel that produces an output to one terminal of the trim servo motor. A second amplifier channel is connected to respond to the trim motor velocity command and produces an output to the second terminal of the trim servo motor.

Further in accordance with the present invention there is provided an aircraft control system that responds to a motor velocity command signal. The control system includes a primary servo system having a servo motor with two terminals and connected to a primary control surface for operation thereof in response to the motor velocity command signal. Also included in the aircraft control system is a trim servo system having a servo motor with two terminals and connected to trim means for the primary control surface for operation thereof in response to a trim motor velocity command. A first velocity detector is connected to the two terminals of the primary system servo motor and responds to the velocity thereof to generate a primary motor velocity signal. Connected to respond to the velocity command signal and the primary motor velocity signal is a first amplifier channel that provides an output to one terminal of the primary system servo motor. A second amplifier channel also responds to the motor velocity command signal and produces an output connected to the second terminal of the primary system servo motor. The energizing current of a primary system servo motor is monitored to generate the trim motor velocity command. Connected to the terminal of the trim system servo motor is a second velocity detector that responds to the trim servo motor velocity to generate a trim motor velocity signal. Responding to the trim motor velocity command and the trim motor velocity signal is a third amplifier channel that provides an output to one terminal of the trim system servo motor. A fourth amplifier channel also responds to the trim motor velocity command and produces an output to the second terminal of the trim subsystem servo motor.

BRIEF DESCRIPTION OF THE DRAWINGS

A more complete understanding of the invention and its advantages will be apparent from the specification and claims and from the accompanying drawings illustrative of the invention.

Referring to the drawings.

DETAILED DESCRIPTION OF THE INVENTION

Figure 1:
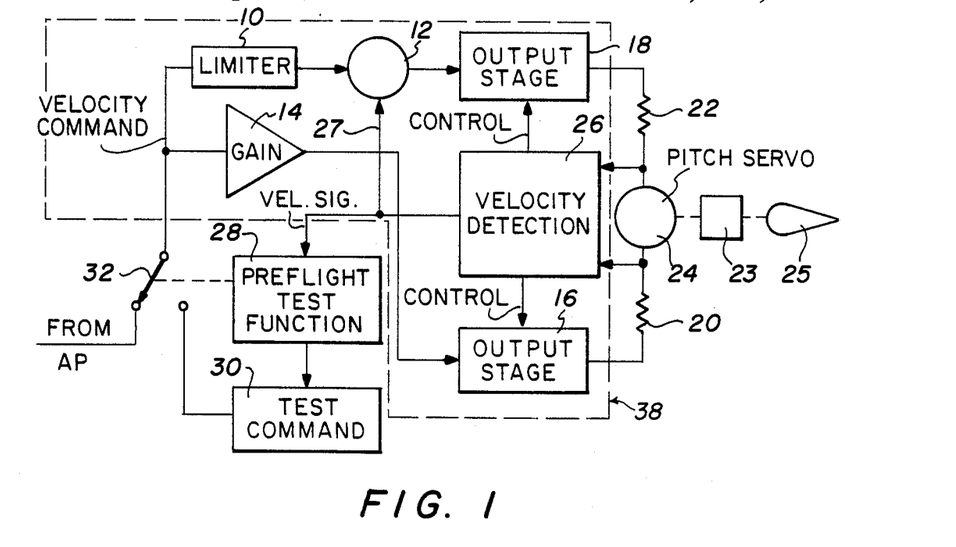
FIG. 1 is a block diagram of the pitch axis control loop for positioning a pitch control surface of an aircraft.

Referring to FIG. 1, there is illustrated the basic elements of a servo amplifier for an automatic flight control system for controlling an aircraft about it pitch axis by means of a control surface 25. It should be understood that a complete automatic flight control system includes automatic stabilization of the aircraft about its yaw, pitch and roll axis, together with apparatus for generating maneuver commands for automatically controlling the aircraft to approach and maintain predetermined flight paths, such as radio beams, and flight paths defined by altitude and air speed sensors. Further, automatic flight control systems include a pitch trim channel for positioning elevator trim tabs on an aircraft control surface such as further detailed in FIG. 2.

The apparatus for generating the manuever commands, including radio coupler equipment, is conventional hardware and applies velocity command signals to an input terminal through a two-position switch 32. Command signals applied to the input terminal include heading error (computed from a radio signal or a directional gyro), attitude error, altitude error and altitude rate of change and, for guiding an aircraft for a landing approach, glide slope error and glide slope rate. It will be understood that these command signals are generated for either the roll or pitch axis of the aircraft or both. In FIG. 1, the command signals applied to the input terminal are only related to the pitch axis.

The pitch axis channel of FIG. 1 comprises a velocity side amplifier channel and a gain side amplifier channel each responsive to a velocity command signal from the input switch 32. For the velocity side channel, the velocity command signal is input to a limiter 10 for limiting the speed of rotation of the pitch control system servo motor to a preset number of revolutions per minute. The limited velocity command from the limiter 10 is applied to a summation amplifier 12 generating an output applied to an output stage 18 of the velocity side channel.

For the gain side channel, the velocity command at the input switch 32 is applied to a gain stage 14 that generates an output applied to an output stage 16.

Each of the output stages 16 and 18 generates a motor drive signal applied through current sense resistors 20 and 22, respectively, to one of two terminals of a pitch servo motor 24. The pitch servo motor 24 is thus energized by the differential voltage generated between the output stages 16 and 18. This differential voltage determines the velocity of the pitch servo motor 24 and also establishes a current through the resistors 20 and 22.

Mechanically connected to the output shaft of the pitch servo motor 24 is a mechanical coupler 23, such as a gear train, for positioning the control surface 25.

Also connected to the two terminals of the pitch servo motor 24 is a velocity detector 26 that responds to the velocity of the servo motor during a sample interval time to generate a velocity signal on a line 27 to the summation amplifier 12. The velocity detector 26 and its operation to respond to the velocity of the servo motor 24 is described in U.S. Pat. No. 4,291,260, issued on Sept. 22, 1981 for "Motor Velocity Control Servo Amplifier."

Also generated by the velocity detector 26 are control signals applied to each of the output stages 16 and 18. These control signals control the sample time interval and the motor drive time interval as described in U.S. Pat. No. 4,291,260.

Connected to the velocity detector 26 is a pre-flight test function circuit 28 that generates pre-flight test commands to command logic 30. The command logic 30 has an output applied to one of the terminals of the input switch 32. During pre-flight check-out of the pitch control system, the input switch 32 applies the output of the test command logic 30 to both the gain side channel and the velocity side channel as described previously. This simulates flight conditions to determine proper functioning of the pitch control system prior to aircraft take-off.

Figure 2:
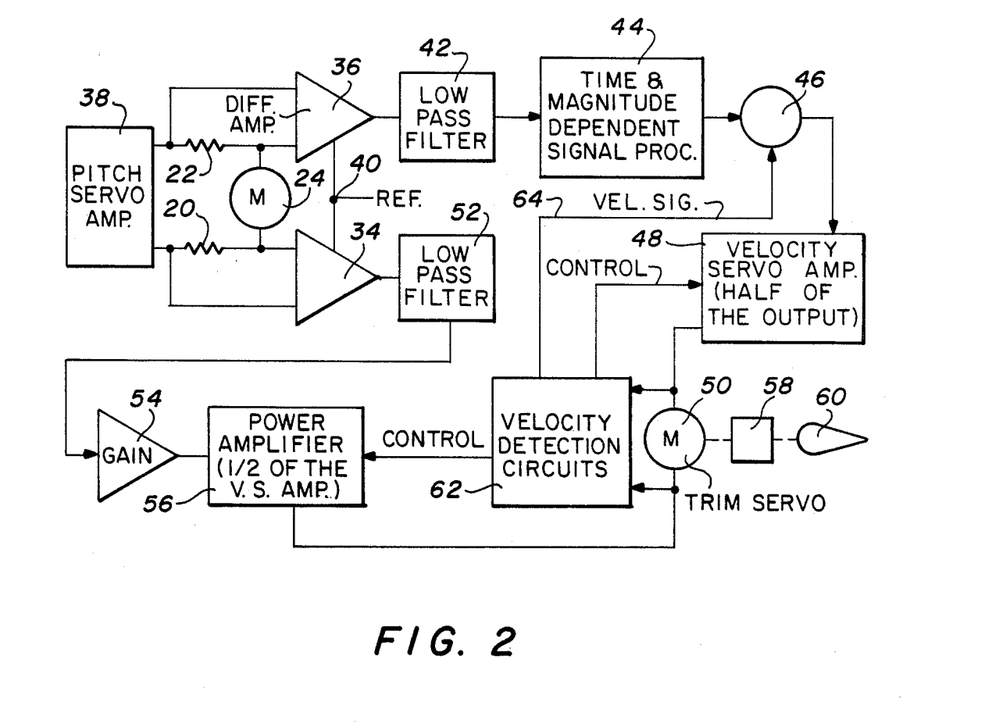
FIG. 2 is a block diagram of an automatic trim system responsive to the energizing current for the servo motor of the pitch axis control loop for positioning a trim surface associated with the pitch control surface.

Referring to FIG. 2, the current sense resistors 20 and 22 are each connected to inputs of differential amplifiers 34 and 36, respectively. In FIG. 2, the system of FIG. 1 including the gain side channel and the velocity side channel are represented by the pitch servo amplifier 38. As explained previously, the voltage applied to the pitch servo motor 24 is the differential between the output stages 16 and 18 as applied to the two terminals of the servo motor. It is this differential voltage, the motor drive signal, that generates the trim motor velocity commands to the differential amplifiers 34 and 36. Each of the amplifiers 34 and 36 generates an output varying about a reference voltage applied to a terminal 40. An output of the differential amplifier 36 is applied through a low pass filter 42 to one input of a signal processing circuit 44. The processing circuit 44 provides time and magnitude processing for the output of the low pass filter 42. The velocity signal output from the signal processor circuit 44 is applied to one input of a summation amplifier 46 that is part of the velocity side trim channel. This is a similar arrangement to the pitch control system of FIG. 1 with the velocity side channel of the trim control system including an output stage 48 receiving an input from the summation amplifier 46. A motor drive signal generated at the output stage 48 is applied to one terminal of a trim servo motor 50.

An output of the differential amplifier 34 is passed through a low pass filter 52 and applied to the input terminal of a gain amplifier 54. The gain amplifier 54 is part of the gain side channel of a pitch servo amplifier for driving the trim servo motor 50. Also included as part of the gain side channel is an output stage 56 connected to the output of the gain amplifier 54. A motor drive signal from the output stage 56 is applied to the second terminal of the trim servo motor 50. Thus, the trim servo motor is driven by the differential voltage generated between the output stage 56 and the output stage 48.

Connected to the trim servo motor 50 is a mechanical coupling 58, for example, a gear train, that positions trim tabs 60 as part of the control surface 25.

Also connected to the two terminals of the trim servo motor 50 is a velocity detector 62 which may be the same as the velocity detector 26 of FIG. 1. An output of the velocity detector circuit 62 is a signal on a line 64 that varies with the velocity of the trim servo motor 50. This velocity signal on the line 64 is applied to a second input of the summation amplifier 46. Also generated by the velocity detector 62 are control signals applied to the output stages 48 and 56. These control signals generate the sample time interval and motor drive time interval as described in U.S. Pat. No. 4,291,260.

In operation, the system of FIG. 2 responds to the current through the resistors 20 and 22 to generate a motor drive signal to drive the trim servo motor 50. The trim command signal as generated across the resistor 22 drives the velocity side channel of the pitch trim control system which generates a motor drive signal applied to one terminal of the trim servo motor 50. A trim command signal generated across the resistor 20 is applied to the gain side channel for producing a differential voltage to drive the trim servo motor 50. The trim servo motor 50 is thus actuated in accordance with the differential voltage applied to the pitch servo motor 24.

Figure 3A:
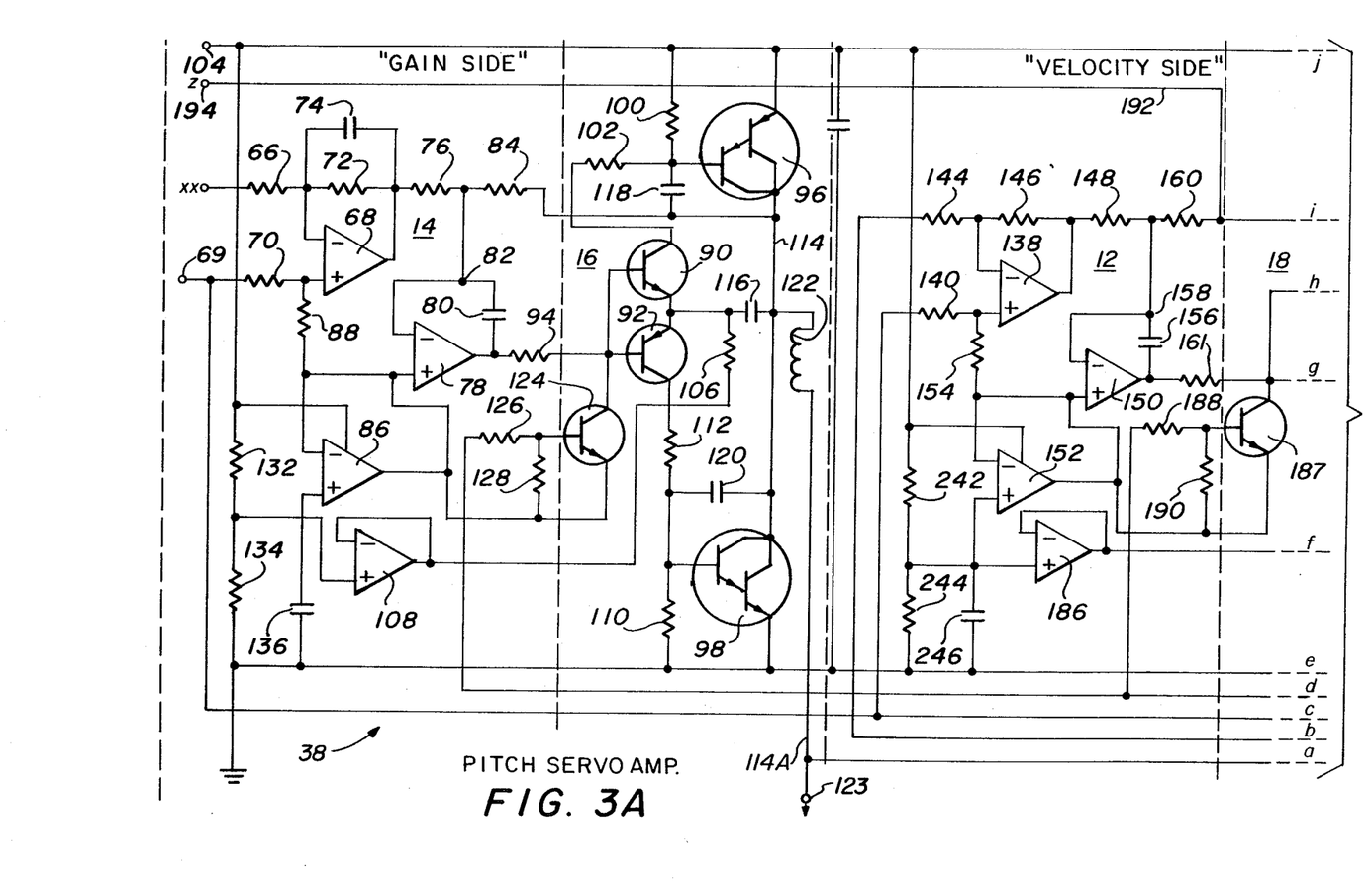
FIGS. 3A and 3B comprise a schematic diagram of the pitch servo amplifiers of FIG. 1 including both the gain side amplifier and the velocity side amplifier.
Figures 3B, 4:
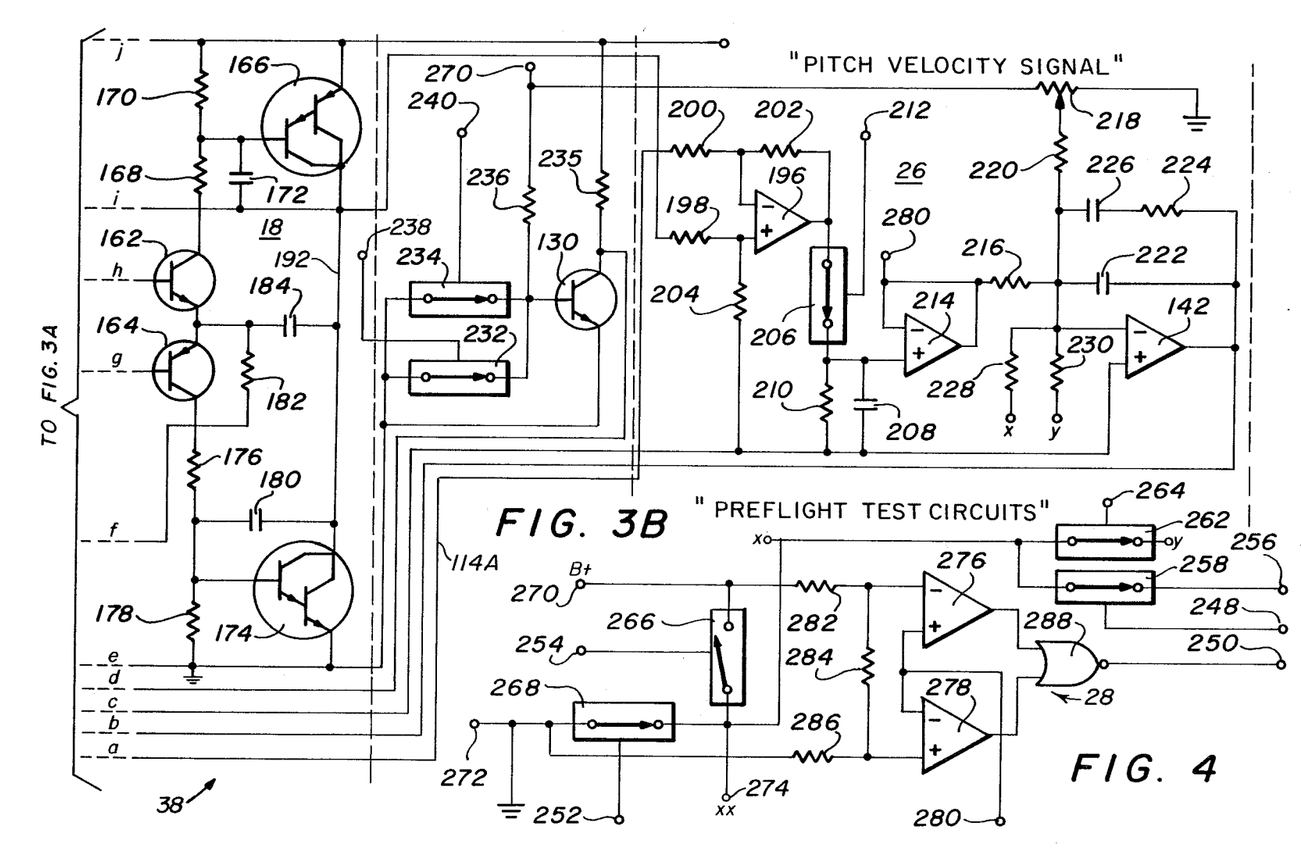
FIG. 4 is a schematic of the preflight test function circuit of FIG. 1.

Referring to FIG. 3, there is shown a schematic of the pitch servo amplifier 38 which includes the system of FIG. 1 with the exception of the pre-flight test function logic 28 and the test command logic 30. The pitch motor velocity command is applied through a command switch (to be described in FIG. 4) through an input resistor 66 to one input of a differential amplifier 68 having a second input connected to a pitch reference voltage through an input resistor 70. The amplifier 68 performs a differential-to-single-ended signal amplification and level shifting function with the gain set by resistors 66, 70, 72 and 88.

By means of the feedback circuit for the amplifier 68, the amplifier gain is tailored to the design characteristics of the pitch servo motor 24 to achieve system stability. Also, by establishing a high gain for the amplifier 68 any low level motor velocity command signal will cause a relatively large voltage change to be applied to the pitch servo motor 24.

One part of a motor drive signal is generated at the output of the amplifier 68 and is applied through an input resistor 76 to a differential amplifier 78. A stabilizing capacitor 80 is connected across the amplifier 78 at a summing junction 82. Also connected to the summing junction 82 is a feedback resistor 84, as will be explained. A second input of the amplifier 78 is a reference voltage generated at the output of a differential amplifier 86. This output of the amplifier 86 also establishes the voltage at the second input of the amplifier 68 through a resistor 88.

A voltage generated at the output of the amplifier 78 is applied to base electrodes of transistors 90 and 92 through a base driving resistor 94. Transistors 90 and 92 are driver elements for a pair of output transistors 96 and 98, respectively. Considering first the circuitry connected to transistor 90, it drives a Darlington transistor pair 96 through a voltage divider network consisting of resistors 100 and 102, the former being connected to a positive voltage supply at a terminal 104. The emitter electrode of the transistor 90 is interconnected to the emitter electrode of the transistor 92 and also connected to a stabilizing resistor 106 as part of the drive circuit for the transistors 90 and 92. The resistor 106 connects to an output voltage as produced by a reference amplifier 108.

Next considering the transistor 92, it drives a Darlington transistor pair 98 through a divider network consisting of resistors 110 and 112, the former connected to ground.

Both the Darlington pairs 96 and 98 are similar circuits with the collector electrodes interconnected by a line 114. A stabilizing capacitor 116 interconnects the collector electrodes of the Darlington pairs 96 and 98 to the stabilizing resistor 106. A stabilizing capacitor 118 is connected across the Darlington pair 96 and a stabilizing capacitor 120 is connected across the Darlington pair 98.

A voltage on the line 114 is coupled through an inductor 122 to an output terminal 123 which is one-half of the motor drive signal applied to one terminal of the pitch servo motor 24.

To control the coupling of the drive voltage on the line 114 to the pitch servo motor 24, the output stage 16 includes a switch transistor 124 having a collector electrode connected to the base electrodes of the transistors 90 and 92. The emitter electrode of the switch transistor 124 is connected to the reference level voltage at the output of the amplifier 86. The transistor 124 is driven by a motor drive time signal applied to the base through an input resistor combination including resistors 126 and 128. The resistor 126 is connected to an enabling switch including a transistor 130.

As previously mentioned, the resistor 84 is a feedback element feeding the output voltage of the Darlington pair 96 and the Darlington pair 98 to the summing junction 82. Basically, the Darlington pairs 96 and 98 provide power amplification for amplifier 78 and the feedback resistor 84 completes the operational loop. The gain of the entire output stage is determined by the values of the resistors 76 and 84. It is thus possible to characterize the output stage of the gain side channel as an operational amplifier with a high output current capability and having the ability of turning off the output by means of the switch transistor 124.

Referring to the differential amplifiers 86 and 108, these provide the reference level voltages by means of a resistor network consisting of resistors 132 and 134, the latter in parallel with a capacitor 136. This resistor-capacitor network connects various inputs of the amplifiers 86 and 108 to generate the required reference level voltages for operation of the gain side channel of the circuit of FIG. 1.

Referring to the velocity side channel, the pitch reference voltage applied to the differential amplifier 68 is also applied to a differential amplifier 138 through an input resistor 140. A second input to the amplifier 138 is a velocity limited pitch motor command generated at the output of a differential amplifier 142. The output of the amplifier 142 is applied through an input resistor 144 to the second input terminal of the differential amplifier 138. Gain of the amplifier 138 is established by resistors 144, 146 and 154. The amplifier 138 performs the same differential-to-single-ended and level shifting function as the amplifier 68.

A motor drive signal at the output of the amplifier 138 is applied through an input resistor 148 to an input of a differential amplifier 150. A second input to the amplifier 150 is a reference level voltage at the output of a differential amplifier 152 that also establishes the input level of the signal applied to the amplifier 138 by means of a resistor 154. A stabilizing capacitor 156 is connected across the amplifier 150 at a summing junction 158 with the resistor 148. Also connected to the summing junction 158 is a feedback resistor 160 which has the same function as the feedback resistor 84 for the gain side channel.

A voltage generated at the output of the amplifier 150 is applied to the base electrodes of transistors 162 and 164 which function in the same manner as the transistors 90 and 92. Thus, the transistor 162 drives a Darlington transistor pair 166 through a voltage divider network including resistors 168 and 170. A stabilizing capacitor 172 is connected across the Darlington pair 166. Similarly, the transistor 164 drives a Darlington transistor pair 174 through a voltage divider network consisting of a resistor 176 and a resistor 178. A stabilizing capacitor 180 is connected across the Darlington pair 174. The emitter electrode of the transistor 162 is interconnected to the emitter electrode of the transistor 164 and also connected to an emitter resistor 182 and a stabilizng capacitor 184. The resistor 182 is connected to a reference level voltage at the output of a differential amplifier 186. The similarity in the circuits between the gain side channel and the velocity side channel should be evident and both circuits function similarly.

Control of the Darlington pairs 166 and 174 is achieved by activating a switch transistor 187 having a base electrode connected through an input resistor 188 to the output of the enabling switch transistor 130. The drive voltage to the base electrode of the transistor 187 is established by a bias resistor 190 connected between the base electrode and the output of the differential amplifier 152. Also connected to the output of the amplifier 152 is the emitter electrode of the transistor 187.

An output from the velocity side channel of the pitch servo amplifier of FIG. 3 is generated on a line 192 interconnecting the two Darlington pairs 166 and 174 and appears at an output terminal 194.

Also connected to the line 192 is a differential amplifier 196 through an input resistor 198. The second input to the differential amplifier 196 is the output of the velocity side channel on the line 114A. This input is applied through an input resistor 200 to the amplifier 196. The amplifier 196 is part of the velocity detector 26 of FIG. 1. The gain of the amplifier 196 is established by a feedback resistor 202 and resistors 198, 200 and 204. The amplifier 196 performs the differential-to-single-ended and level shifting function as amplifiers 68 and 138. The bias resistor 204 connected to the pitch reference at terminal 69 sets the input to the second terminal of the amplifier 196.

An output of the amplifier 196 is applied through a sample switch 206 to a storage capacitor 208 in parallel with a resistor 210. The storage capacitor 208 comprises the complete circuit of the motor velocity detector 26 and stores a back EMF voltage from the pitch servo motor 24 during a sample time interval as determined by a sample time interval signal on a terminal 212. This connection of the output of the amplifier 196 through the switch 206 occurs only during the sample time interval. During all other times the switch 206 is opened by removal of the sample time interval signal from the terminal 212. During the motor drive time when the output voltage is generated on the lines 114 and 192 and applied to the pitch servo motor, the switch 206 is opened and the storage capacitor 208 stores the last measured value of the back EMF of motor 24.

The stored voltage on the capacitor 208 is applied to an input of an operational amplifier 214 that generates a pitch velocity signal applied through an input resistor 216 to one input of the amplifier 142. A second input of the amplifier 142 is the pitch reference on terminal 69 (FIG. 3A).

Also connected to the amplifier 142 is a bias circuit including a variable resistor 218 connected across the voltage source and including a wiper arm tied to a resistor 220. The feedback circuit for the amplifier 142 includes a capacitor 222 in parallel with a resistor 224 in series with a capacitor 226.

For pre-flight check-out of the pitch servo amplifier, resistors 228 and 230 are connected to the amplifier 142. These resistors are connected to the pre-flight test circuit 28 of FIG. 4.

Returning to the enabling switch transistor 130, a base electrode is interconnected to enabling switches 232 and 234 and also to a bias resistor 236. The switches 232 and 234 are interconnected along with the emitter electrode of the transistor 130 to ground. The switch 232 is controlled by a pitch motor enable signal applied to a terminal 238 and the switch 234 is controlled by a timing signal applied to a terminal 240. Operation of the enabling switch transistor 130 activates both the switch transistors 124 and 187 as described previously with reference to the transistor 124. Both the transistors 124 and 187 have a similar operation.

Returning to the differential amplifiers 152 and 186, the voltage levels are established by means of a resistor network including resistor 242 in series with a resistor 244, the latter in parallel with a capacitor 246.

Referring to FIG. 4, there is shown a schematic of the pre-flight test circuit 28 that receives test signals on input terminals 248, 252, and 254. Also input to the test circuit of FIG. 4 at a terminal 256 is the pitch motor velocity command. The pitch motor velocity command is applied to switch 258 which comprises part of the input switch 32 of FIG. 1. With the switch 258 in the closed position the motor velocity command is applied to the resistor 228 (FIG. 3B) and to a switch 262 also part of the input switch 32 of FIG. 1. The switch 262 is controlled by a fifth test input to the circuit of FIG. 4 applied to a terminal 264. With the switch 262 closed, the motor velocity command is also applied to the resistor 230 (FIG. 3B). This in effect parallels the resistors 228 and 230.

Also tied to the switches 258 and 262 are test switches 266 and 268 also parts of input switch 32 of FIG. 1. The switch 266 connects to a power supply at an input terminal 270 and the switch 268, which works alternately connects with switch 266, to ground at a terminal 272. The interconnection of switches 266 and 268 is tied to a terminal 274 that provides the motor velocity command to the differential amplifier of the gain side channel through resistor 66 FIG. 3A.

Also forming part of the test circuit 28 are differential amplifiers 276 and 278 having a common interconnection to the pitch velocity signal at the output of the amplifier 214 by means of the terminal 280. The second input of each of the amplifiers 276 and 278 is interconnected to a voltage divider network consisting of resistors 282, 284 and 286 connected between the terminal 270 and ground at the terminal 272. The output of each of the amplifiers 276 and 278 is connected to a NOR gate 288 having an output connected to an output terminal 250.

Functionally, operation of the circuit of FIG. 4 exercises the circuit of FIG. 3 to check the performance thereof during pre-flight checkout. The various test signals simulate operating conditions.

Figure 5:
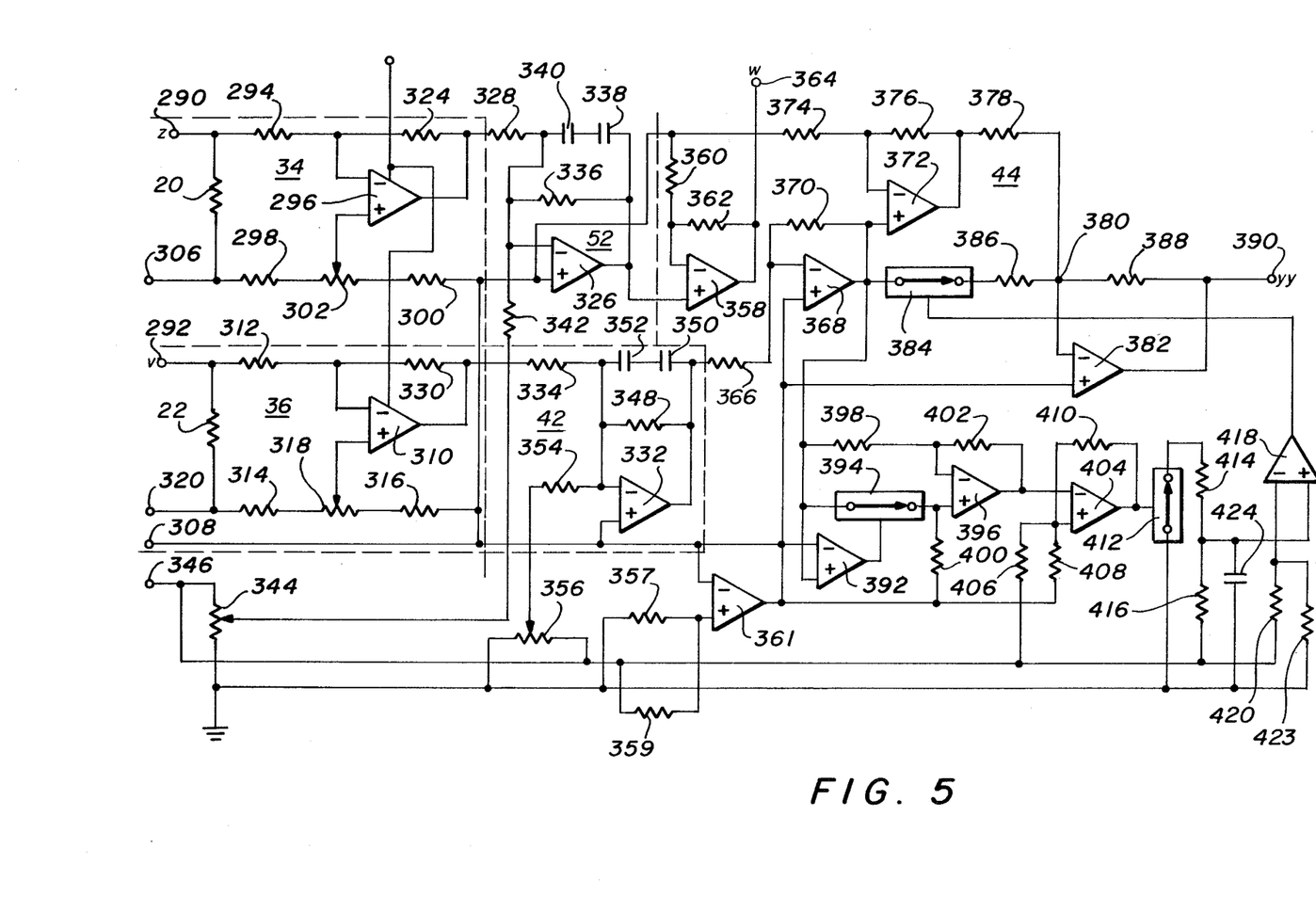
FIG. 5 is a schematic diagram of the pitch motor current sensing and trim signal processing circuits and logic of FIG. 2.

Referring to FIG. 5, there is shown a schematic of the current sensing section of the trim control system of FIG. 2 where the signal on the line 114A of FIG. 3B is applied to a terminal 290 and the signal on the line 192A FIG. 3A is applied to a terminal 292. The terminal 290 is connected to the current sensing resistor 20 and to an input resistor 294 for a differential-to-single-ended amplifier 296. Connected to the second input of the amplifier 296 is an adjustable reference that includes resistors 298 and 300 and a variable resistor 302. The resistors 298 and 300 and the variable resistor 302 are interconnected between an input terminal 306 and a trim reference voltage applied to a terminal 308. The resistive network including resistors 294, 298, 300, 302 and 304 in conjunction with the amplifier 296 perform the differential-to-single-ended conversion.

The signal on line 192A of FIG. 3 as appearing on the input terminal 292 is applied to the current sense resistor 22 and to a differential-to-single-ended amplifier 310 through an input resistor 312. A second input to the amplifier 310 is connected to a resistor network including resistors 314 and 316 and a variable resistor 318. This network connects between an input terminal 320 and the trim reference voltage at the terminal 308. The resistors 312, 314, 316, 318 and 330 in conjunction with the amplifier 310 perform the differential-to-single ended conversion.

Basically, the amplifiers 296 and 310 are similar, each responding to an input voltage as developed across a current sense resistor.

An output of the amplifier 296 is fed back through a feedback resistor 324 and also applied through an input resistor 328 to one input of a differential amplifier 326 that functions as a low pass filter. An output of the amplifier 310 is fed back through a resistor 330 and also applied to one input of a differential amplifier 332 through an input resistor 334. With reference to the amplifier 336, a second input thereof is connected to the trim reference at terminal 308. A feedback network from the amplifier 326 includes a resistor 336 in parallel with capacitors 338 and 340. Also connected to the first input of the amplifier 326 is an adjustable bias including a resistor 342 connected to a variable resistor 344. The variable resistor 344 is tied between a regulated DC supply at terminal 346 and ground.

A circuit similar to that interconnected to the amplifier 326 is also connected to the amplifier 332 which also functions as a low pass filter. A second input of the amplifier 332 is tied to the trim reference at terminal 308 and a feedback loop for the amplifier includes a resistor 348 in parallel with series capacitor 350 and 352. The first input to the amplifier 332 is connected to an adjustable bias by means of a resistor 354 connected to a variable resistor 356 tied between the terminal 346 and ground.

An output of the amplifier 326 is applied through a non-inverting amplifier 358 that has a second input connected to the trim reference voltage at terminal 308 through an input resistor 360. Gain of the amplifier 358 is established by a feedback resistor 362. An output of the amplifier 358 is applied to a terminal 364 and is the input connected to the gain amplifier 54 of FIG. 2.

An output of amplifier 332 is applied through an input resistor 366 to an inverting amplifier 368 having a second input connected to the trim reference voltage at terminal 308. A feedback circuit for the amplifier 368 includes a resistor 370 that sets the amplifier gain.

An output of the amplifier 368 is applied to one input of an amplifier 372 having a second input connected through an input resistor 374 to the trim reference voltage at terminal 308. The gain of the amplifier 372 is set by a feedback resistor 376. The output of the amplifier 372 is applied through an input resistor 378 to a summing junction 380 that is tied to one input terminal of a differential amplifier 382. Also connected to the junction 380 is the output of the amplifier 368 through a switch 384 in series with a resistor 386. Control of the switch 384 is by processing logic to be described.

A second input to the amplifier 382 is tied to the trim reference voltage at terminal 308 and a feedback resistor 388 sets the gain of the amplifier. An output of the amplifier 382 appears on a terminal 390 and is the trim motor velocity command applied to the summing amplifier 46 of FIG. 2.

Referring to the logic processing circuitry of FIG. 5, an output of the amplifier 368 is applied to one input of a differential amplifier 392 having a second input tied to the trim reference voltage at terminal 308. The output of the amplifier 392 controls an input switch 394 tied to one input of an inverting amplifier 396. A second input of the amplifier 396 is tied to the output of the amplifier 368 through an input resistor 398. Also connected to the switch 394 is a bias resistor 400 connected to the trim reference voltage at terminal 308. A gain resistor 402 is connected in a feedback loop for the amplifier 396 that generates an output to one input of a comparator amplifier 404 with hysteresis. A second input of the amplifier 404 is connected to the regulated DC voltage at terminal 346 through a resistor 406 and the trim reference voltage at terminal 308 through a resistor 408. A feedback resistor 410 sets the hysteresis value of the amplifier 404.

The amplifier 404 controls a switch 412 connected to a voltage divider network consisting of resistors 414 and 416. The switch 412 when closed connects the resistor 414 to ground. The resistor 416 is tied to the regulated DC voltage at terminal 346. Tied to the interconnection of the resistors 414 and 416 is one input of a comparator amplifier 418 having a second input connected to a divider network consisting of a resistor 420 and a resistor 422 interconnected between the regulated DC voltage at terminal 346 and ground. Also connected to the first input of the amplifier 418 is a timing capacitor 424. The output of the amplifier 418 controls the switch 384 and the circuit connected thereto as explained previously.

In operation, the circuit of FIG. 5 responds to the current in the resistors 20 and 22 to generate the input voltage to the amplifier 54 and the trim motor velocity command to the summing amplifier 46.

Figure 6A:
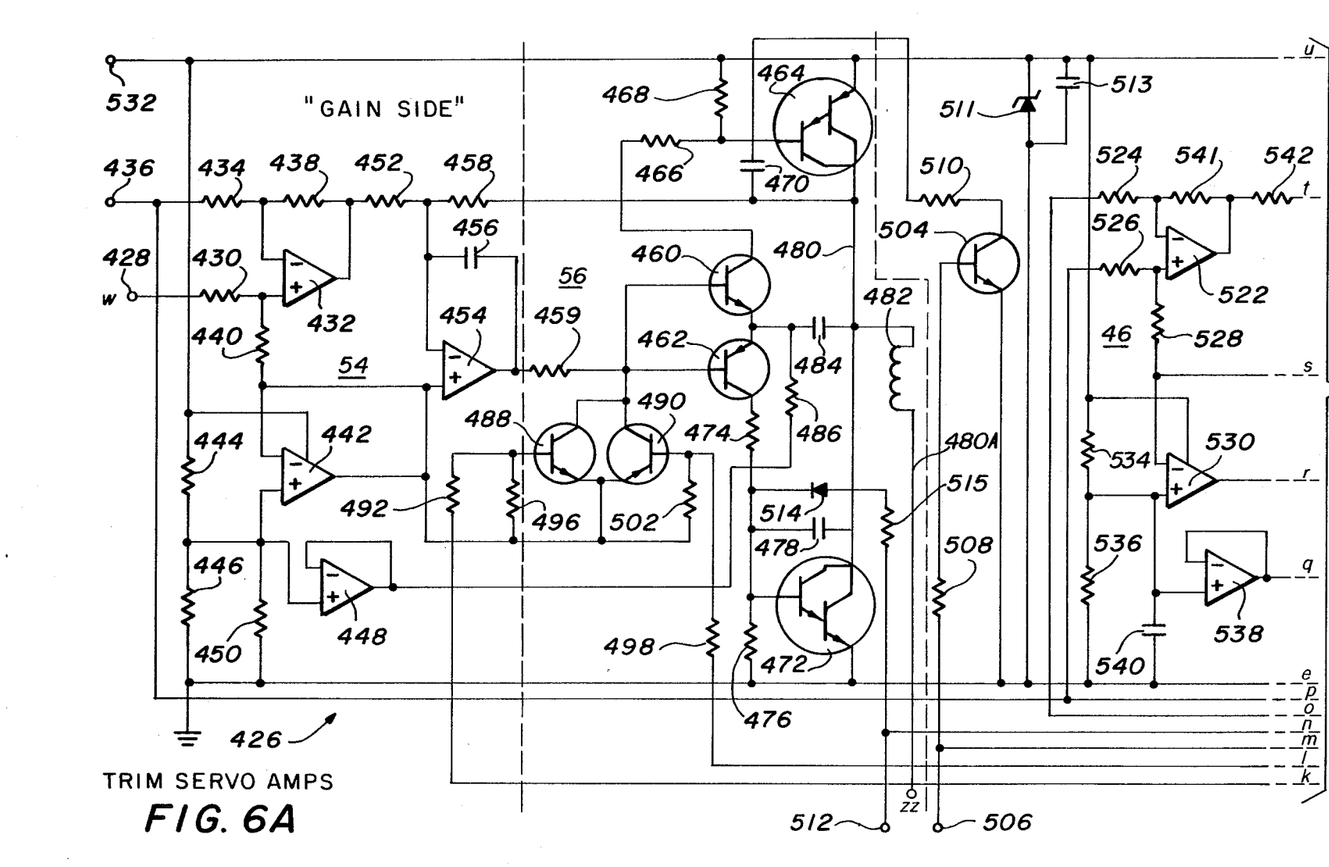
FIGS. 6A and 6B comprise a schematic of the trim servo amplifier of FIG. 2 including the gain side amplifier and the velocity side amplifier.
Figure 6B:
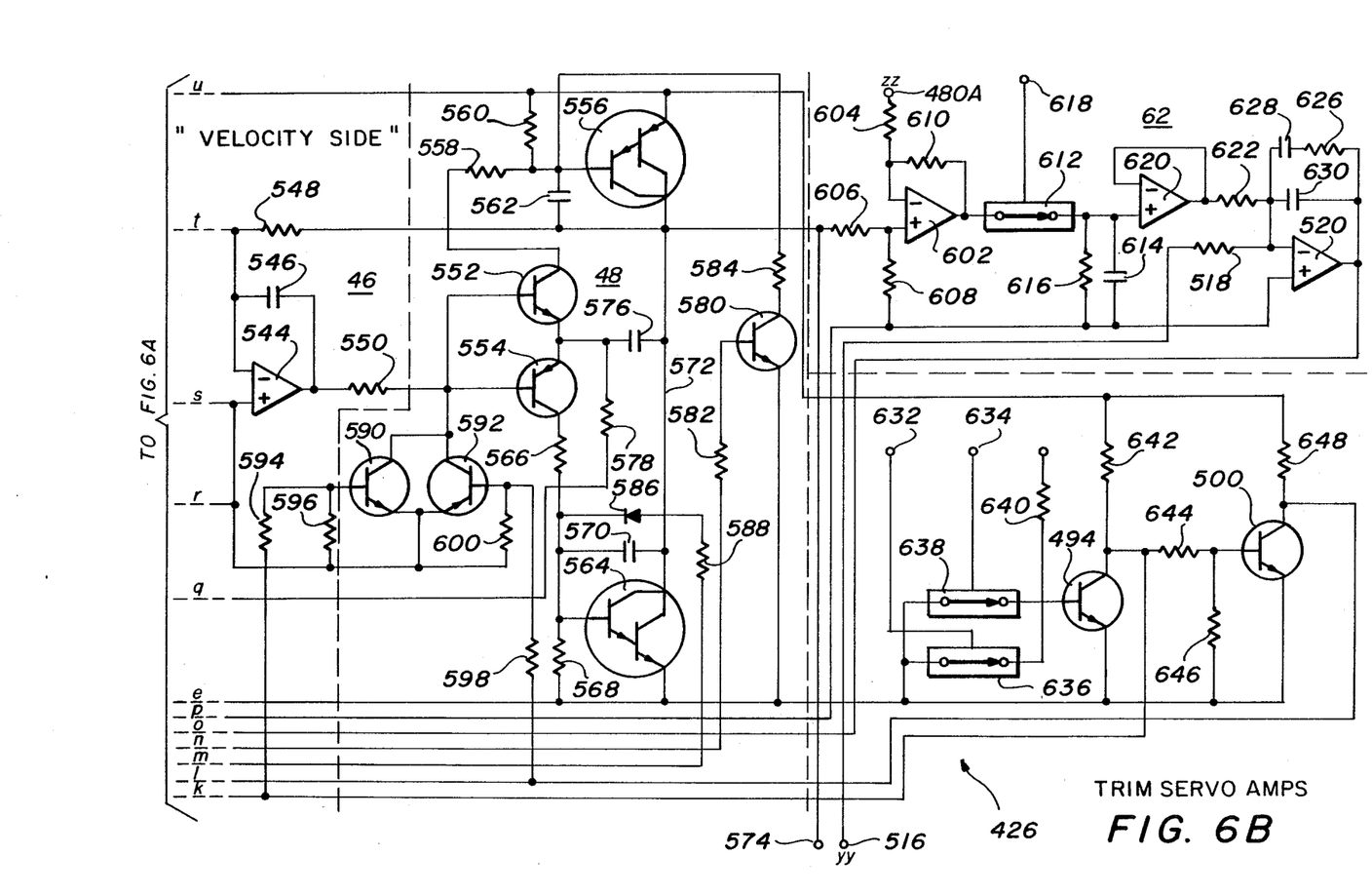

Referring to FIG. 6, there is shown a schematic of the gain side channel and the velocity side channel for the trim control system of FIG. 2. A trim input signal generated on the terminal 364 of FIG. 5 is applied to an input terminal 428 for the gain side channel of the trim control system. This trim input is applied through an input resistor 430 to one input of a differential-to-single-ended amplifier 432. It should be noted that the gain side channel of the trim servo amplifier of FIG. 6 is similar to the gain side channel of the pitch servo amplifier of FIG. 3. Thus, the amplifier 432 receives a second signal applied through an input resistor 434 from an input terminal 436. This second signal is a trim reference voltage appearing on the terminal 436. A feedback circuit for the amplifier 432 includes a resistor 438.

The trim input as applied to the amplifier 432 through a resistor 440 connected to the output of a differential amplifier 442 which functions in the same manner as the amplifier 86 of FIG. 3. Thus, the amplifier 442 is connected to an input circuit consisting of resistors 444 and 446. Also connected to the resistors 444 and 446 is differential amplifier 448 that functions in a manner similar to the amplifier 108 of FIG. 3. Connected to the input circuit of the amplifier 448 is a resistor 450.

An output of the amplifier 432 is applied through an input resistor 452 to one input of a differential amplifier 454 that has a second input tied to the output of the amplifier 442. A feedback capacitor 456 provides frequency compensation for the amplifier 454. A feedback resistor 458 is also connected to one input of the amplifier 454. This resistor 458 functions the same as the feedback resistor 84 of FIG. 3.

A voltage generated at the output of the amplifier 454 is applied through a base drive resistor 459 to the base electrode of transistors 460 and 462. The transistor 460 is interconnected to a Darlington transistor pair 464 through a divider network consisting of resistors 466 and 468. A compensation capacitor 470 is connected across the base-to-collector terminals of the Darlington pair 464. Similarly, the transistor 462 is connected to a Darlington transistor pair 472 through a divider network consisting of a resistor 474 and a resistor 476. A compensation capacitor 478 is interconnected across the Darlington pair 472.

A stabilizing capacitor 484 is connected between a line 480 and the interconnected emitter electrodes of the transistors 460 and 462. Also connected to the interconnected emitter electrodes is a resistor 486 tied to the output of the amplifier 448.

Both the Darlington pairs 464 and 472 and the associated switching transistors 460 and 462 are similar to the Darlington pairs 96 and 98 of FIG. 3. As such, the Darlington pairs have interconnected collector electrodes by means of the line 480 which is connected to an inductor coil 482. The output of the gain side channel of the trim servo amplifier appears on the line 480A and is applied to one terminal of the trim servo motor 50.

To control the coupling of the output of the amplifier 454 to the transistors 460 and 462, the gain side channel includes transistors 488 and 490. These transistors have interconnected collector electrodes tied to the base electrodes of the transistors 460 and 462. The transistor 488 is driven through a base drive resistor 492 from the output of a transistor 494 as part of a switching logic circuit. A bias resistor 496 is connected between the base electrode of the transistor 488 and the output of the amplifier 442. The transistor 490 is driven through a base drive resistor 498 from the output of a transistor 500 also forming a part of the switching logic of the trim servo amplifier. A bias resistor 502 sets the base drive voltage for the transistor 490 and is connected to the output of the amplifier 442.

Also included in the gain side channel of the trim servo amplifier is a manual control transistor 504 connected to a manual trim-down signal on a terminal 506 through an input resistor 508. The emitter of the transistor 504 is grounded while the collector electrode is connected through a resistor 510 to the base electrodes of the Darlington pair 464. Tied to the base electrodes of the Darlington pair 472 is the manual trim-up signal on the terminal 512 through a diode 514 and resistor 515.

With reference to the velocity side channel of the trim servo amplifier, the trim motor velocity command from terminal 390 of FIG. 5 is applied to terminal 516. This signal is input through a resistor 518 to one input of a comparator amplifier 520. A second input to the amplifier 520 is the trim reference voltage on terminal 436. The output of the amplifier 520 is applied to one input of a differential-to-single-ended amplifier 522 through an input resistor 524. It should be noted that the velocity side channel of the trim servo motor including the amplifier 522 is similar to the velocity side channel of the pitch servo amplifier of FIG. 3.

A second input to the amplifier 522 is the trim reference voltage on terminal 436 applied through an input resistor 526 and connected to a resistor 528. The resistor 528 is connected to the output of a differential amplifier 530 that provides a voltage reference for the velocity side channel. The amplifier 530 performs a similar function as the amplifier 152 of FIG. 3. The voltage drive for the amplifier 530 is provided by a divider network connected between a voltage source applied to a terminal 532 and ground. This divider network consists of a resistor 534 in series with a resistor 536. The interconnection of these two resistors is also connected to one input of an amplifier 538 and a capacitor 540. The amplifier 538 also provides a reference voltage for the velocity side channel and functions in the same manner as the amplifier 186 of FIG. 3.

Included in the differential-to-single-ended resistive network of the amplifier 522 is a resistor 541. An output of the amplifier 522 is applied through an input resistor 542 to one input of a amplifier 544 having a second input tied to the output of the amplifier 530 and including a feedback capacitor 546. Connected in the feedback path for the amplifier 544 is a feedback resistor 548 which has the same function as the resistor 160 of FIG. 3.

An output of the amplifier 544 is applied through an input resistor 550 to the interconnected base electrodes of transistors 552 and 554. Considering first the transistor 552, it is interconnected to a Darlington transistor pair 556 by means of a divider network consisting of resistors 558 and 560. A stabilizing capacitor 562 is connected across the Darlington pair. Again, this is similar to the Darlington pair 166 and the transistor 162 of the velocity side channel of the pitch servo amplifier of FIG. 3. The transistor 554 is interconnected to a Darlington transistor pair 564 through a divider network consisting of a resistor 566 and a resistor 568. An isolating capacitor 570 is connected across the Darlington pair 564.

Connected across the Darlington pairs 556 and 564 is a line 572 which is connected to an output terminal 574. The voltage on the terminal 574 is the motor drive voltage from the amplifier 48 of FIG. 2 applied to one terminal of the trim servo motor 50.

Completing the output stage of the velocity side channel is an capacitor 576 connected between line 572 and the common emitter connection of the transistors 552 and 554. Also connected to the transistors 552 and 554 is a resistor 578 connected to the output of the amplifier 538. Connected to the base electrode of the Darlington pair 556 is a manual trim transistor 580 activated by a manual trim down signal applied to a terminal 506 through an input resistor 582. The transistor 580 is connected to the base electrode of the Darlington pair 556 through a collector resistor 584. Connected to the base electrode of the Darlington pair 564 is a diode 586 which receives a manual trim-down signal on the terminal 512 through a resistor 588.

To control the coupling of the output of the amplifier 544 to the transistors 552 and 554 there is included in the velocity side channel transistors 590 and 592. These function in the same manner as the transistors 488 and 490 of the gain side channel of the trim servo amplifier. The transistor 590 is connected to the transistor 494 through a resistor 594 and is biased by means of a resistor 596. The transistor 592 is connected to the transistor 500 through an input resistor 598. This transistor is biased by a resistor 600 connected to the output of the amplifier 530.

Each of the output voltages from the gain side channel on line 480 and the velocity side channel on line 572 are connected to the velocity detector 62. Specifically, these voltages are connected to a differential amplifier 602 forming a part of the velocity detector. The voltage on the line 480 is applied through an input resistor 604 to the amplifier 602 while the output on the line 572 is applied through an input resistor 606, also to the amplifier input. The resistor 606 is tied to a bias resistor 608 connected to the trim reference voltage on the input terminal 436. The gain of the amplifier 602 is established by a feedback resistor 610 connected between the output and the input at the resistor 604.

The output of the amplifier 602 is applied through a sample switch 612 to a storage capacitor 614 in parallel with a timing resistor 616. The storage capacitor 614 comprises a hold circuit of the motor velocity detector 62 and stores a voltage representing the back EMF of the trim servo motor 50 during a sample time interval. Control of the sample switch 612 is by means of a sample time interval signal applied to an input terminal 618.

A voltage stored on the capacitor 614 is applied to one input of an operational amplifier 620 and provides a motor velocity signal applied to one input of the comparator amplifier 520. This motor velocity signal is applied to an input resistor 622 through a mixing or summing junction 624 which also receives the trim motor velocity command through the input resistor 518. Gain of the amplifier 520 is established by a feedback resistor 626 and amplifier response time is established by a network consisting of the resistor 626 in series with a capacitor 628. A capacitor 630 is also a part of the circuit that establishes the response time of the amplifier 520. As previously explained, the output of the amplifier 520 is applied to the amplifier 522 as one input to the velocity side channel of the trim servo amplifier.

Considering the transistors 494 and 500, these are part of an enabling circuit controlled by input signals on terminals 632 and 634. The enable signal on the terminal 632 is applied to a switch 636 and the enable signal on the terminal 634 is applied to a switch 638. These switches control activation of the transistor 494 through an input resistor 640. The transistor 494 is connected through a load resistor 642 to the positive voltage supply at the terminal 532 and its output is applied to the gain side and velocity side channels of the trim servo amplifier, as previously explained. In addition, the output of the transistor 494 drives the base electrode of the transistor 500 through a resistor network consisting of an input resistor 644 and a bias resistor 646. The output of the transistor 500, which is also connected to the gain side and velocity side channel of the trim servo amplifier. Transistor 500 is connected to the terminal 532 through a drive resistor 648. These two transistors 494 and 500 respond to the closures of the switches 636 and 638 to control the motor drive time interval of the gain side channel and the velocity side channel by means of the transistors 488, 490 and the transistors 590, 592, as previously explained.

Reference has heretofore been made to U.S. Pat. No. 4,291,260 for a motor velocity controlled servo amplifier. The circuitry of the gain side channel and the velocity side channel for both the pitch servo amplifier and the trim servo amplifier is also detailed in this United States patent. Reference is made to the disclosure of this patent for further supporting description of the present invention along with operational description of the circuitry herein disclosed.

While only one embodiment of the invention, together with modifications thereof, has been described in detail herein and shown in the accompanying drawings, it will be evident that various further modifications are possible without departing from the scope of the invention.

I claim:

1. An aircraft control system responsive to a motor velocity command signal, comprising in combination:
    a servo system including a servo motor having two terminals and connected to a control surface, the servo system further including means for applying a signal to actuate the servo motor and thereby move the control surface,
    a velocity detector connected to the two terminals of the servo motor and responsive to the velocity thereof to generate a motor velocity signal,
    a first amplifier channel connected to respond to the velocity command signal and the motor velocity signal and providing an output to one terminal of the servo motor,
    a second amplifier channel connected to respond to the velocity command signal and producing an output to the second terminal of the servo motor, and
    means for limiting the velocity command signal connected to the first amplifier channel.

2. An aircraft control system as set forth in claim 1 wherein the velocity detector generates first and second control signals connected respectively to the first and second amplifier channels.

3. An aircraft control system as set forth in claim 1 wherein said first amplifier channel includes means for combining the motor velocity signal and the motor velocity command signal into a motor drive signal.

4. An aircraft control system responsive to a motor velocity command signal, comprising in combination:
  a servo system including a servo motor having two terminals and connected to a control surface, the servo system further including means for applying a signal to actuate the servo motor and thereby move the control surface,
  a velocity detector connected to the two terminals of the servo motor and responsive to the velocity thereof to generate a motor velocity signal,
  a first amplifier channel connected to respond to the velocity command signal and the motor velocity signal and providing an output to one terminal of the servo motor,
  a second amplifier channel connected to respond to the velocity command signal and producing an output to the second terminal of the servo motor,
  means connected to respond to the motor velocity signal to generate test function signals, and
  switching means for alternately connecting the first and second amplifier channels between the motor velocity command signal and the test function signals.

5. An aircraft control system as set forth in claim 4 wherein said first amplifier channel includes means for combining the motor velocity signal and the motor velocity command signal into a motor drive signal.

6. An aircraft control system as set forth in claim 5 including means for limiting the motor velocity command signal connected to the first amplifier channel.

7. An aircraft control system as set forth in claim 6 wherein the velocity detector generates first and second control signals connected respectively to the first and second amplifier channels.

8. An aircraft control system, comprising in combination:
  a primary servo system including a servo motor having two terminals and connected to a primary control surface for operation thereof in response to an applied signal;
  a trim servo system including a servo motor having two terminals and connected to trim means for the primary control surface for operating said trim means in accordance with an applied signal;
  means responsive to the applied signal of the primary servo motor to generate a trim servo motor velocity command;
  a velocity detector connected to the two terminals of the trim system servo motor and responsive to the velocity thereof to generate a trim motor velocity signal;
  a first amplifier channel connected to respond to the trim motor velocity command and the trim motor velocity signal and providing an output to one terminal of the trim system servo motor; and
  a second amplifier channel connected to respond to the trim motor velocity command and producing an output to the second terminal of the trim system servo motor.

9. An aircraft control system as set forth in claim 8 wherein said means responsive to the signal applied to the primary system servo motor includes a current sensor connected to the terminals of the primary system servo motor.

10. An aircraft control system as set forth in claim 9 wherein said means responsive to the primary servo motor drive current includes means for generating a first component of the trim motor velocity command for the first amplifier channel and for generating a second component of the motor velocity command to the second amplifier channel.

11. An aircraft control system as set forth in claim 10 wherein said means for generating a first component of the trim motor velocity command includes a current sensor connected to one terminal of the primary system servo motor, and said means for generating a second component of the trim motor velocity command includes a current sensor connected to the second terminal of the primary system servo motor.

12. An aircraft control system as set forth in claim 8 wherein said first amplifier channel includes means for combining the trim motor velocity signal and the trim motor velocity command into a trim motor drive signal.

13. An aircraft control system as set forth in claim 12 wherein the velocity detector generates first and second control signals connected respectively to the first and second amplifier channels.

14. An aircraft control system responsive to a motor velocity command signal, comprising in combination:
  a primary servo system including a servo motor having two terminals and connected to a primary control surface for operation thereof in response to the motor velocity command signal;
  a trim servo system including a servo motor having two terminals and connected to trim means for the primary control surface for operation of the trim means in response to a trim motor velocity command signal;
  a first velocity detector connected to the two terminals of the primary system servo motor and responsive to the velocity thereof to generate a primary system motor velocity signal;
  a first amplifier channel connected to respond to the motor velocity command signal and the primary system motor velocity signal and providing an output to one terminal of the primary system servo motor;
  a second amplifier channel connected to respond to the motor velocity command signal and producing an output connected to the second terminal of the primary system servo motor;
  means responsive to the energizing voltage of the primary system servo motor to generate the trim motor velocity command signal;
  a second velocity detector connected to the two terminals of the trim system servo motor and responsive to the velocity thereof to generate a trim motor velocity signal;
  a third amplifier channel connected to respond to the trim motor velocity command signal and the trim motor velocity signal and providing an output to one terminal of the trim system servo motor; and
  a fourth amplifier channel connected to respond to the trim motor velocity command and producing an output to the second terminal of the trim system servo motor.

15. An aircraft control system as set forth in claim 14 including means for limiting the velocity command signal connected to the first amplifier channel.

16. An aircraft control system as set forth in claim 14 wherein said means responsive to the primary system servo motor energizing current includes means for generating a first component of the trim motor velocity command signal to the third amplifier channel and means for generating a second component of the trim motor velocity command signal connected to the fourth amplifier channel.

17. An aircraft control system as set forth in claim 16 wherein said means for generating the first component of the trim motor velocity command signal includes a current sensor connected to the first terminal of the primary system servo motor, and said means for generating the second component of the trim motor velocity command signal includes a current sensor connected to the second terminal of the primary system servo motor.

18. An aircraft control system as set forth in claim 14 wherein said first amplifier channel includes the means for combining the motor velocity command signal and the primary servo motor velocity signal into a primary system servo motor drive signal.

19. An aircraft control system as set forth in claim 14 wherein said third amplifier channel includes means for combining the trim motor velocity command signal and the trim motor velocity signal into a trim motor drive signal.

20. An aircraft control system as set forth in claim 14 wherein the first velocity detector generates first and second control signals connected respectively to the first and second amplifier channels.

21. An aircraft control system as set forth in claim 20 wherein the second velocity detector generates third and fourth control signals connected respectively to the third and fourth amplifier channels.

22. An aircraft control system responsive to a motor velocity command signal, comprising in combination:
 a primary servo system including a servo motor having two terminals and connected to a primary control surface for operation thereof in response to the motor velocity command signal;
 a trim servo system including a servo motor having two terminals and connected to trim means for the primary control surface for operation of the trim means in response to a trim motor velocity command signal;
 a first velocity detector connected to the two terminals of the primary system servo motor and responsive to the velocity thereof to generate a primary system motor velocity signal;
 a first amplifier channel connected to respond to the velocity command signal and the primary system motor velocity signal and providing an output to one terminal of the primary system servo motor;
 a second amplifier channel connected to respond to the motor velocity command signal, and producing an output connected to the second terminal of the primary system servo motor;
 means responsive to the energizing voltage of the primary system servo motor to generate the trim motor velocity command signal;
 a second velocity detector connected to the two terminals of the trim system servo motor and responsive to the velocity thereof to generate a trim motor velocity signal;
 a third amplifier channel connected to respond to the trim motor velocity command signal and the trim motor velocity signal and providing an output to one terminal of the trim system servo motor;
 a fourth amplifier channel connected to respond to the trim motor velocity command signal and producing an output to the second terminal of the trim system servo motor;
 means connected to respond to the primary system servo motor velocity signal to generate test function signals; and
 switching means for alternately connecting the first and second amplifier channels between the motor velocity command signal and the test function signals.

* * * * *

UNITED STATES PATENT AND TRADEMARK OFFICE
CERTIFICATE OF CORRECTION

PATENT NO. : 4,583,030

DATED : April 15, 1983

INVENTOR(S) : John M. Nixon

It is certified that error appears in the above-identified patent and that said Letters Patent is hereby corrected as shown below:

In Column 2, line 14, delete "harving" and insert -- having --; Column 3, line 46, delete "it" and insert -- its --; Column 9, line 7, delete "connects"; Column 9, line 7, before "to" insert -- connects --; Column 9, line 40, delete "304" and insert -- 324 --; Column 11, line 51, delete "connected" and insert -- interconnected; and Column 13, line 8, delete "Connected across" and insert -- Connecting --.

Signed and Sealed this

Twenty-second Day of July 1986

[SEAL]

Attest:

DONALD J. QUIGG

*Attesting Officer*     *Commissioner of Patents and Trademarks*